United States Patent [19]

Utzinger

[11] Patent Number: 4,879,037

[45] Date of Patent: Nov. 7, 1989

[54] METHOD AND APPARATUS FOR COUNTER CURRENT LIQUID-LIQUID EXTRACTION

[76] Inventor: Gustav E. Utzinger, Kastelweid 231,, 4249 Himmelried, Switzerland

[21] Appl. No.: 169,498

[22] Filed: Mar. 17, 1988

Related U.S. Application Data

[60] Division of Ser. No. 852,633, Apr. 16, 1986, Pat. No. 4,749,130, which is a continuation-in-part of Ser. No. 523,175, Aug. 15, 1983, abandoned.

[30] Foreign Application Priority Data

Aug. 14, 1982 [CH] Switzerland .......................... 4855/82

[51] Int. Cl.⁴ .............................................. B01D 11/04
[52] U.S. Cl. .................................... 210/634; 210/511; 422/257; 422/224
[58] Field of Search ............... 422/256, 257, 239, 255, 422/215, 224; 210/511, 634; 239/543-547, 558

[56] References Cited

U.S. PATENT DOCUMENTS

| | | | |
|---|---|---|---|
| 3,199,956 | 8/1965 | Ferrari | 23/267 |
| 4,305,907 | 12/1981 | Baird | 422/111 |
| 4,749,130 | 6/1988 | Utzinger | 239/543 |

FOREIGN PATENT DOCUMENTS 1553005 9/1979 United Kingdom .

Primary Examiner—W. Gary Jones
Assistant Examiner—Matthew O. Savage
Attorney, Agent, or Firm—Wells & White

[57] ABSTRACT

A liquid-liquid extraction device and method for operating the same is disclosed. The device includes first and second conduits in flow communication with each other via a common wall having a large number of perforations. The second conduit includes an outer tube wall having a plurality of perforations leading to the outside of the device. When liquid in the first conduit is subjected to a pressure higher than that of the second conduit, and the pressure of the liquid in the second conduit is higher than that of the ambient pressure, liquid will be allowed to flow from the first conduit via perforations in the common wall into the second conduit so as to intermingle with the liquid in the second conduit. The resultant mixture in the second conduit is then ejected to the outside as a fine liquid jet via the perforations in the outer tube wall. The first and second conduits are constructed of a liquid-tight, elastically resilient material being non-swelling in contact with organic extraction solvents.

12 Claims, 4 Drawing Sheets

METHOD AND APPARATUS FOR COUNTER CURRENT LIQUID-LIQUID EXTRACTION

This is a division of application Ser. No. 06/852,633, filed 16 April 86, now U.S. Pat. No. 4,749,130 which in turn is a continuation in part of application Ser. No. 06/523,175 filed on Aug. 15, 1983 and now abandoned.

BACKGROUND OF THE INVENTION

This invention relates to liquid-spraying systems comprising
(a) an elongated tubular conduit means adapted for the flow of liquid therethrough,
(b) a tube wall of liquid-tight, elastically resilient material,
(c) liquid feeding means connected to one of the ends of the conduit means,
(d) closing means for at least substantially closing off the other end of the conduit means, and
(e) a plurality of perforations of substantially circular cross sectional area through the tube walls and leading from the conduit interior to outside of the external tube wall surface.

It will be understood that the tubular conduit means, e.g. a hose, has two ends and an elongated conduit interior extending from one end of the conduit means to the other, that the tube wall surrounds the elongated conduit interior and has an external and an internal tube wall surface, and that the liquid feeding means are adapted for causing liquid to flow into the conduit interior.

The present application is a division of application Ser. No. 06/852,633 filed Apr. 16, 1986 and now U.S. Pat. 4,749,130 which in turn is a continuation-in-part of application Ser. No. 06/523,175 filed Aug. 15, 1983 and now abandoned.

More particularly, such shower system comprises
(a) an elongated tubular conduit means adapted for the flow of liquid therethrough, having two ends and an elongated conduit interior extending from one end of the conduit means to the other, and being of the configuration of a helix having a central helix axis and confining an internal helix space,
said helix being adapted for positioning with its axis disposed substantially vertically, the diameter and height of the helix being such as to house a person standing or sitting within the internal space of the helix of vertically disposed helix axis, which conduit means comprise:
(b) a tube wall of liquid-tight, elastically resilient material, being non-swelling in contact with water of a temperature of 60° C. or higher and with organic extraction solvents, which tube wall surrounds the elongated conduit interior and has an external and an internal tube wall surface,
(c) one end of the conduit means is adapted for connection to a source of bath water of adjustable temperature,
(d) closing means for at least substantially closing off the other end of the conduit means,
(e) a plurality of substantially capillary-active and uniform perforations preferably of substantially circular cross-sectional area through the tube wall leading from the conduit interior to outside the external tube wall surface, which perforations are substantially uniformly distributed.

This type of shower system has been described in the French patent to S.A. dite SAEREXI, of Calvados, France, having Publication No. 2,032,014. This shower system is also provided with suspension means connecting the windings of the tube constituting the helix at a given spacing and support means from which the suspension means depend and which can comprise a system of crinoline-like rings.

However, when using tubes having a conventional type of perforation in a given configuration and arrangement of the holes in the tube wall, it has been found that the user will not be able to suffer, over a prolonged period of time, i.e. several minutes up to 5 or even 10 minutes, water jets having a temperature of more than 40° C., and usually only about 38° to 39° C., i.e. one or two degrees above normal body temperature.

When taking a normal shower, a water temperature above 40° C. (104° F.) is barely supported by the user The shower also has a stimulating effect on blood circulation, however the bundle of water impinges in a relatively limited area of the user's body and still leaves areas of the skin unattained which permits the user to register temperatures differences which cause such person to stop the shower, usually without having reached transpiration. On an average, a shower is used by a person for less than 3 minutes.

Installations as can be found in spas, which permit thermal baths or prolonged showers, require costly apparatus and personnel.

Moreover, it is difficult to avoid a pressure drop over a distance of several meters and maintain a uniform ejection of liquid from so many nozzles when the nozzle openings have been punched or pierced in such material as sheet iron or the like metal, when the available pressure is in the order of water pressure from the city main. The longer the distance from the pressure source and the larger the number of nozzles, the more difficult does it become to maintain a relatively uniform ejection of the water.

OBJECTS AND SUMMARY OF THE FIRST INVENTION ASPECT

It is a principal object of the first aspect of the invention to provide a tubular, perforated enveloping shower of the above-described SAEREXI type in which a user is exposed to a therapeutical effect as achieved in a sauna.

In order to attain a sauna-like effect it must be borne in mind that the body of a person taking a bath in a sauna is exposed to a mixture of steam and air having a temperature ranging from 70° C. to close to 100° C. (160° to 210° F.), with short interruptions for a period of 20 to 40 minutes. This sauna bath improves blood circulation and is therapeutically beneficial in other respects.

It is another object of a first particular aspect of my invention to provide a liquid-spraying system which is useful in hydrotherapy, which can be used at low pressure rates such as prevail e.g., in the water main, and which has hydrotherapeutic effects similar to, but more readily supported and for longer periods than a hot shower and at least as well as a sauna bath.

It is therefore a further object of the invention to provide a shower installation, as an alternative to a sauna, which permits a person to use water above 40° C. without unpleasant effects and for a period sufficiently long to cause perspiration of the user's body.

I have found that these objects can be attained in a helical shower as initially described having, in combination, the following features characterizing the invention:

(i) the perforations have an outlet size in the order of 0.8 mm$^2$, and are preferably circular, having a diameter the order of 1 mm, i.e. of from about 0.8 to 1.2 mm, (ii) the length of the spraying zone of the hose is from about 10 to 20 meters, (iii) the number of perforations is about 150 to 400 over the entire length of the helix, the distance between two adjacent perforations being constant and in the range of from 2.5 to at most 10 cm, and preferably from about 5 to 7 cm, (iv) the internal width of the tube is about 15 mm and the perforations are located in a substantially straight row on the inner side of the tubular conduit and are adapted for directing each a fine liquid jet radially toward said helix axis at the respective level of the perforation above the ground.

A preferred embodiment of the shower system according to the invention has at least one and preferably all of the following features:

(1) the tube wall material is a thermoplastic synthetic resin, preferably a polyamide of a nylon type such as polymerized laurolactam, Grilamid, Polyamide 12 (1 25 W 40 ) or an at least partially aromatic polyamide. being the most preferred material as it has particularly desirable smoothness and resistance to temperature and stability to aging;

(2) the number of the perforations is at least 15 and preferably about 20 per meter of the spraying zone, (3) the thickness of the wall tube is from about 0.8 to 2.5 mm;

(4) the distance between two adjacent windings of the helix is about 10 to 20 cm; and/or (5) the diameter of the helix winding is about 75 to 100 cm.

Polyamid 12 and Grilamid are marketed by Ems-Chemie AG, Zurich, Switzerland.

The above-described specific dimension ranges were found by me to be critical in attaining the desired sauna-effect.

Such dimensions were not found in earlier publications none of which describe shower systems for hydrotherapy. Thus, none are given in German Offenlegungsschrift 24 32 126 to Wichman, which discloses an apparatus for spraying a patient's body, or a part of his or her body, in particular the extremities, with a device having a plurality of spraying orifices. The apparatus is destined to produce itinerant, variable liquid rays in zones whose configurations are described as disks or columns, by switching the admission of liquid to the individual zones by means of adjustable valves associated with the zones, such variation to be dependent on changes in a patient's pulse rate and other body properties. Chambers of sickle or half-moon shaped cross section are, for instance, superimposed in zones, and patterns of spraying orifices direct the liquid jets to a center in each zone. The half-moon disk chambers are to be steered to wander upward and/or downward along a treated member of the patient's body, travel between an elbow joint and the finger-tips of the same arm, or between the knee cap and the ankle of a patient's leg being specifically mentioned. A sauna-effect is not envisaged and, consequently, no specific arrangement or dimensions are given to achieve the same.

Specific dimensions are given for a multiple jet fluid spraying system described in U.S. Pat. No. 3,727,841 to Hengesbach. The looped tubes to be used in the Hengesbach system are to be extruded from clear cellulose acetate butyrate having an outside diameter of 9.4 mm (⅜″) and an inside diameter of 7.8 mm (5/16″). Tubes of 42′ (12.60 m) are to be perforated at a spacing, between adjacent orifices, of 15 cm (6″), and each orifice having an internal width of 0.5 mm to 0.8 mm.

I made comparative tests with hoses made from polyamide 12 (12 carbon atoms between each amido group), because cellulose acetate butyrate is too unelastic to produce helices of the above-stated critical dimensions from the same. It must be taken into consideration that the Hengesbach configurations are limited to wide areas or straight hose pieces. Moreover, I found that polyamide 12 has satisfactory resilience for making helices, avoiding the danger of kinking which occurred frequently when trying to bend a cellulose acetate butyrate tube to adopt a helix configuration for the shower system according to the invention.

COMPARATIVE TESTS

In order to show the criticality of the features stated above, tests were made

A. with a tubular helix within the definitions of claim 1 of the instant application;

B. with a tubular helix of the same type as used in Test A., but with the perforation spacing as disclosed by Hengesbach; and C. a tubular helix in which all Hengesbach dimensions were observed.

| Feature: | Tubular helix according to | | |
|---|---|---|---|
| | Claim 1 | Adaptation to perforations of Hengesbach | Hengesbach (U.S. Pat. No. 3,727,841) |
| 1. Internal width of tube | 16 mm | 16 mm | 8 mm |
| 2 length of helix | 18 m | 18 m | 13 m |
| 3. internal width of perforation | 0.8 mm | 0.8 mm | 0.8 mm |
| 4. spacing between two adjacent perforations | 5 cm | 15 cm | 15 cm |

These comparative tests have shown that a sauna effect as described by the applicant on page 6 of the specification can only be obtained with the helix according to the applicant's invention and that manifestly the internal width of the hose forming the helix, the length of the hose and the distance between two successive perforations in the hose, i.e., the number of perforations per meter are critical in achieving the desired effect. A sauna effect demands, for instance, that the user transpires. This requires a water temperature of 43° C. or higher. This can indeed be achieved in the case of the applicant's helix. Test persons have supported 44° and 46° C. with the novel helix, while a person taking a shower in a helix of the dimensions disclosed as optimal by Hengesbach (U.S. Pat. No. 3,727,841) will not support a higher water temperature than 38° C. or at most 40° C.

Moreover, if the shower is turned on to normal strength, the water jets exert on the body of the showering person a very unpleasant needle point effect, which is only supported for a very brief period. When the strength of the water jets was reduced to avoid this needle point effect, the water flowed out of the perforations in the hose according to the Hengesbach dimensions at such a low rate that it began to drip down from the hose windings. The water rate could not be fine-tuned to achieve a readily supportable jet free from the needle point effect.

When a hose of the dimensions taught by me is modified, in accordance with Hengesbach's teachings to have the perforations at a distance of 15 cm (6 inches), the needle point effect is somewhat weaker, but still unpleasant. Temperatures of 40° C., insufficient to attain a sauna effect could be supported by test persons for a short time only.

The above-described shower installation can be equipped with liquid flow control means and/or with temperature adjusting means for manually adjusting the flow rate and/or the temperature of the liquid being sprayed out of the perforations of the helix. These liquid flow control and/or temperature adjusting means are preferably arranged relative to the helix so as to be reachable by a person standing or sitting in the internal helix space.

Surprisingly, a person standing or sitting in the internal helix space of the above-described shower installation, being sprayed from all sides by the fine sprays from the perforated conduit means according to the invention, supports water temperatures of 40° C. and considerably higher which such person could consider unsupportably hot, when a hot spray from a conventional shower having nozzle openings punched or pierced in a circular shower area impinges on a limited area of his or her skin.

The mantle of hot liquid uniformly covering the body of a person using the shower installation according to the invention at a water temperature above 40° C., e.g. 42° to 45° C., causes in the body of that person a long-lasting feeling of well being until such person begins to transpire. After a short intermediary cooling-off period, this treatment can be repeated.

As it is possible to replace the small water volume of a given temperature in the helix very rapidly by water of a different temperature, it is easy to use the shower installation according to the invention for taking an alternating hot and cold bath.

While, under a conventional shower, a considerable proportion of the water from the water jets, due to their size, is reflected from the skin, the water from very fine jets of the helical shower installation according to the invention largely remains on the skin, thus affording a higher degree of efficiency of the energy consumed in heating the water.

The quality of the therapeutical treatment offered by the helical shower installation according to the invention can be further enhanced or diversified by admixing suitable adjuvants with the water being sprayed. These adjuvants can be costly perfumes or the like because the water consumption by the novel shower installation is very restricted, e.g. from 120 to 180 liters during 10 minutes of treatment while a full bath in a bath tub requires about 200 to 400 liters of water.

It is very convenient, if the temperature adjusting means such as a hot-and-cold water mixing valve can be reached by the person taking the shower in standing or sitting position. Intermediary showering with cold water thus becomes possible without having to leave the installation as one must do in a sauna.

The thickness of the tube wall of the elongated conduit means of the liquid-spraying system according to the invention preferably ranges from 0.8 to 2.5 mm, it is preferably considerably greater than the thickness recommended for the perforated water trickling hose described by Sumitomo Chemical Co. Ltd. in German Offenlegungschrift 28 35 117.

The production of the perforations having the above described properties required for achieving a satisfactory spraying of liquid by the spraying system according to the invention, in the elastically resilient extruded tube wall material which is needed for attaining all of the objects of the invention, meets with certain difficulties, which are not encountered when producing similar perforations in metal tubing.

Piercing the perforations with the aid of a fine needle leads to the formation of burr on the internal tube wall surface which obstructs the flow of liquid from the conduit interior into the perforation in an irregular manner. Piercing with heated needles leads to adhesion of the softened tube wall material to the needles and an irregular perforation.

Preferably the perforations are made by punching the freshly extruded material as it passes through a helix-bending machine.

Instead of boring the perforations of capillary size, it is also possible to punch larger holes and then insert nozzles having the desired capillary diameter. Nozzles can be of any suitable material, e.g. hard synthetic resin material as the tubular conduits, glass or a suitable metal such as $V_2A$ steel.

The perforations are preferably small enough to produce capillary forces between water and the material of the surrounding tube wall sufficient to substantially prevent water filling the conduit interior from flowing out of the perforations while the water in the conduit interior is under ambient pressure, but being sufficiently large and of such configuration as to permit ejection of the liquid jet substantially free from trickling, when the liquid in the conduit interior is under excess pressure at least of the magnitude derived from a water main. Excess pressure in the water main fluctuates between 0.3 and 1.5 bar.

When the pressure source, e.g. the water main to which the liquid feeding means are connected is turned off, the liquid remaining in the conduit interior should preferably be held back by the capillary forces active in the perforations due to their size and configuration, and to the interface tension between the liquid and the surrounding tube wall material. These capillary forces should be at least strong enough so that no more than a trickle of liquid should slowly emerge from the perforations, for instance when the spraying zone of the conduit means tube wall is very long, e.g. 10 to 20 meters or more and extends in vertical position, the number of perforations then being at least 150 to 300 or more.

It is important for achieving close to optimal results satisfying the object of the instant invention that the perforations have a capillary diameter, i.e. that they open to eject a liquid jet, only when the conduit interior is connected to a low excess pressure source such as a water main, or to a similar source delivering another liquid at a pressure at least in the same range as that of the water main.

OBJECTS AND SUMMARY OF A SECOND PARTICULAR ASPECT OF THE INVENTION

It is an object according to another particular aspect of the invention to provide a novel extractor apparatus and a novel method of liquid-liquid extraction, making use of the above-described novel spraying system according to the invention.

The conduit means described hereinbefore, and also the helical embodiment thereof have been found most suitable for use in the fractionated extraction that can be employed for the separation of mixed reaction products, the recovery of useful substances from waste waters, the separation of physically and/or chemically closely related substances, and the extraction by spraying of vegetable substances or of inorganic substances such as ores.

It is well known that liquid-liquid extraction techniques provide for the extraction of a liquid from a solution by intimate contact of that solution, preferably in a countercurrent manner, and usually in an extraction column, which is equipped with mechanical means for promoting intimate contact of the first-mentioned solution with another liquid phase in which one or more components of the first solution are readily soluble, and which second liquid phase, becoming a solution of at least one of the components of the first solution, must be immiscible, or have a wide immiscibility gap, with the solvent of the first solution. By repeated and intimate contact of the first and second solution, and collecting vessels at such contact zones, a heavy-phase solution containing part of the solute components, and a light-phase solution containing the other part of such components will separate in two different layers, one of which can then be removed from the other.

Among the known liquid-liquid extraction techniques, a modern one has been described in U.S. Pat. No. 4,305,907 to Baird, and involves use of an extraction column, in which column a light-phase liquid and a heavy-phase liquid are intimately mixed in a countercurrent direction, equipped with timing controls for sequentially pulsing the light and heavy phases and controlling the operation of the valves which introduce into the withdrawel valves from the column the liquid phases based on the proportions in percent of phase-volume changes occurring in the liquid-liquid extraction in the column. Thereby, the liquid-liquid interfaces in the column are maintained substantially constant. This requires considerable control equipment, for instance interface control means positioned at one or several interfaces in the column to detect a change in position of the liquid-liquid interface during operation of the column as well as another timing device in communication with the interface control means and with the first timing means to adjust the first mentioned timing means, which control the introduction and withdrawel of the light and heavy phases and the respective solutions, responsive to the detected interface position, so as to maintain the interface in substantially the same position throughout the extracting operation.

One of the drawbacks of this known liquid-liquid extraction system is the occurrence of phase-change volume depletion, and the need for special equipment to avoid such occurrence.

In another known liquid-liquid extraction apparatus described by Yoichiro Ito, in British Pat. No. 1,553,005, continuous countercurrent extraction is carried out in a rotating array of helical separation tubes made from Teflon through which a heavy-phase and a light-phase liquid are passed consecutively in a continuous countercurrent operation.

The tubes are unperforated and each has a length of about 5 meters having about 100 windings. The throughput is about 0.075 to 0.75 liter and the output is about 10 to 100 mag per hour. The apparatus serves mainly for the extraction of very small amounts of biological material such as L-leucyl-L-turosine and other similar peptides (see also Chemical & Engineering News, Mar. 21, 1983).

It would not be possible to substantially enlarge the Ito apparatus because they would require wider tubes, and this would result in reduction of the extraction effect, because the two streams of liquid would largely pass each other in the coils in spite of the rotation of the latter, in view of the inertia of the liquids. Intermingling of the liquids would be insufficient. Also, the rotation of larger tubes might cause emulsions thus preventing separation of the phases.

It is, therefore, an object of the second aspect of the invention to provide a liquid-liquid extractor apparatus which is of simpler operation and less complicated construction than the known apparatus.

It is another object of the second aspect of the invention to provide a method of liquid-liquid extraction which is easier and less costly to carry out in practice than the hitherto known methods.

It is a further object of this aspect of the invention to provide an apparatus and method for liquid-liquid extraction which is free from the possibility of phase-change volume depletions occurring during the operation, so that special equipment and measures to avoid such depletions can be dispensed with.

It is yet another object of this aspect of my invention to provide an apparatus for liquid-liquid extraction which is energy-saving and free from rotating parts, having especially stationary extraction tube means.

It is still a further object of this invention to provide an apparatus and a method for liquid-liquid extraction which would permit a continuous countercurrent iterative extraction.

These objects are attained in accordance with the second invention aspect by providing a novel liquid-liquid extractor apparatus in which a light-phase liquid and a heavy-phase liquid are intimately mixed in a column to provide for the extraction of a solute from one of the phases by the other phase, which apparatus comprises:

(a) a first conduit for liquid-liquid extraction which has two conduit ends one of which is closable and the other is open;

(b) feeding means connected to the open end of this first conduit, for introducing one of the light-phase and heavy-phase liquids, which latter contains therein solute to be extracted by the light-phase liquid, into the interior of the first conduit, (c) a second conduit having two ends one of which is closable and the other is open;

(d) second feeding means connected to the open end of the second conduit, and being adapted for introducing the other one of the two beforesaid liquids into the interior of the second conduit, and (e) each of the first and second conduits has a hollow interior extending from one end of the respective column to the other, and comprises a tube wall of liquid-tight, elastically resilient material, being non-swelling in contact with water of a temperature of 60° C. or higher and with organic extraction solvents, which tube wall surrounds the said elongated conduit interior and has an external and an internal tube wall surface; and this first conduit comprises (f) a large number of uniform perforations and substantially circular cross-sectional area, which perforations lead from the conduit interior of the first conduit through the tube wall of the first conduit into the hollow interior of the second conduit; and the second conduit comprises (g) a large number of uniform capillary active perforations of substantially circular cross-sectional area through the tube wall of the second conduit leading from the conduit interior of the second conduit to outside the external tube wall surface thereof, all of the perforations of the first and second conduits being of such configuration and width that, when the interior of the second conduit is filled with liquid under a pressure above the ambient one, the perforations of the second conduit will permit ejection of liquid from the interior of the second conduit to the outside as a fine liquid jet, and when the interior of the first conduit is filled with a liquid under pressure above that prevailing in the second conduit, the perforations of the first conduit will permit the ejection of liquid from the interior of the first conduit into the interior of the second conduit.

The pressure in the second conduit must, of course, be sufficient to overcome the resistance to the ejection of liquid therefrom due to the capillary activity of these perforations and the interface tension of the liquid.

In a preferred embodiment of the liquid-liquid extractor apparatus according to the second invention aspect, the first conduit and the second conduit are arranged parallel with one another and comprise a contact zone in which the tube wall of the first conduit is merged with the tube wall of the second conduit, and the perforations in this zone of the tube wall of the first conduit lead from the interior of the first conduit into the interior of the second conduit.

In another, most preferred embodiment of this second invention aspect, the first conduit is mounted in the interior of the second conduit, constituting a double tube comprising an inner and an outer conduit as the first and second conduits, surrounding a common longitudinal axis and having concentric cross-sectional areas.

Preferably, the double tube has the configuration of a helix, the windings of which enclose a helix interior having a central helix axis. The perforations in the tube wall enclosing the second, outer conduit are so disposed therein as to direct the jets ejected through them toward the central helix axis, describing ballistic curves.

The double tube can also have the configuration of a serpentine.

The liquid-liquid extractor apparatus can further comprise a plurality of collecting vessels associated with different stages comprising a determined number of the perforations of the second conduit and arranged in axial direction along the second conduit to collect the liquid ejected from the perforations of each of the said stages, respectively.

Preferably, the liquid-liquid extractor apparatus further comprises a plurality of separator units of which each unit is connected to a collecting vessel, each separator unit comprises a chamber for separated heavy-phase liquid and a chamber for separated light-phase liquid, as well as first pipe line means connecting the chamber for light-phase liquid with that one of the first and second conduits which is fed with light-phase liquid, and second pipe line means connecting the chamber for heavy-phase liquid with the other one of the first and second conduits which is fed with heavy-phase liquid, in the same zone of the said first and second conduits in which the perforations of the second conduit are located from which the liquid jets collected in the collecting vessel connected with the respective separator unit have been ejected.

In accordance with the second aspect of the invention there is also provided a novel method of liquid-liquid extraction of at least one solute dissolved in a first liquid being a solution of the solute in a solvent therefore, which method comprises the steps of (a) directing a stream of the first liquid through a first elongated channel from an entry end toward a terminal end of the first channel, and maintaining in the first channel a determined pressure above ambient, (b) directing a stream of a second liquid of different density, counter-currently to the first liquid stream, through a second elongated channel from an entry end toward a terminal end of the second channel, and maintaining in the second channel an excess pressure lower than the pressure in the first channel, the first and second channels having longitudinal axes, and one of the first and second liquids being the heavier, and the other the lighter one, (c) maintaining between the first and second channels, a separating wall zone of liquid-tight elastically resilient material being substantially non-swelling when in contact with water having a temperature of 60° C. or higher, or when in contact with organic extraction solvents, which wall zone has a first and a second contact surface on opposite sides thereof, which surfaces border on the first and second channels, respectively, extending parallel with the axes of the said channels;

this wall zone contains a plurality of crosswise passages therethrough from the first to the second contact surface, which passages are distributed uniformly along the said wall zone in axial direction;

(d) passing a large number of streams of the first liquid, ejected from the first channel through the said passages successively into the second channel, and intermingling the first liquid streams therein cross-currently with the stream of second liquid flowing counter-currently through the second channel, while at the same time maintaining the exit end of the first channel at least substantially obturated, thereby maintaining in the first channel a determined pressure above the pressure prevailing in the second channel, and maintaining the exit end of the second channel obturated, (e) ejecting a large number of fine liquid jets of the resulting liquid mixture iteratively out of the second channel, transversely to the direction of liquid flow through that channel;

(f) collecting groups of the ejected liquid jets, from successive ejection zones of the second channel, (g) settling the portions of the liquid mixture, obtained from such zones, with phase separation, (h) separating the resulting heavier and lighter phases of each liquid portion from each other, (i) back-feeding the separated heavier phase of a liquid portion from an intermediate zone of the second channel, into approximately the same zone, but of that channel which contains the stream of the heavier liquid, and (j) back-feeding the lighter phase of a liquid portion from an intermediate zone of the second channel, into approximately the same zone of that channel which contains the stream of the lighter liquid;

(k) recovering from that ejection zone last preceding the terminal end of the second channel one of the phases resulting from the separation of the liquid portion collected from that zone, and back-feeding the other phase into the said first channel, in the same, last-mentioned ejection zone.

In a preferred mode of operation, one of the two streams is an annular stream having a hollow longitudinal space in its interior, and the other stream is directed countercurrently thereto through the said hollow interior of the first-mentioned stream.

Preferably, the annular stream is a stream of heavy-phase liquid and the other stream is a stream of light-phase liquid. The annular stream of heavy-phase liquid can be directed from a higher level downward to a lower level, and the stream of light-phase liquid is directed through the interior of the annular stream, but from the lower level upward to the higher level, and preferably, the two streams follow a helical path. That channel through which the heavier one of the liquids is directed, is preferably filled with granules, inert toward the liquids, for instance with beads of Teflon PFA or glass.

Preferably, at least a major portion or all of the volume of the light-phase liquid consists of a light-phase solvent, and at least a major portion of the volume of the heavy-phase liquid consists of a heavy-phase solvent, which light-phase and heavy-phase solvents are totally immiscible with one another, or are miscible with each other only with an immiscibilty gap.

The apparatus and method according to the invention are particularly useful when two solute components having very similar solubility in a given heavy-phase solvent, have a slightly more different solubility in the light-phase solvent or viceversa.

Such components can be fatty acids, acids, derived from resin, peptides, proteins, insulin produced with the aid of bacteria, m-cresol and p-cresol, heavy water and normal water, and many others (see "Difficult separations by extraction" by E. G. Scheibel, published in Chemical Engineering Progress, supra).

The foregoing as well as other objects and advantages of the present invention and the particular aspects thereof will become apparent by reference to the following detailed description thereof with reference to the accompanying drawings which illustrate, by way of example, preferred embodiments of installations according to the invention.

DETAILED DESCRIPTION OF THE EMBODIMENTS SHOWN IN THE DRAWINGS

Figure 1:
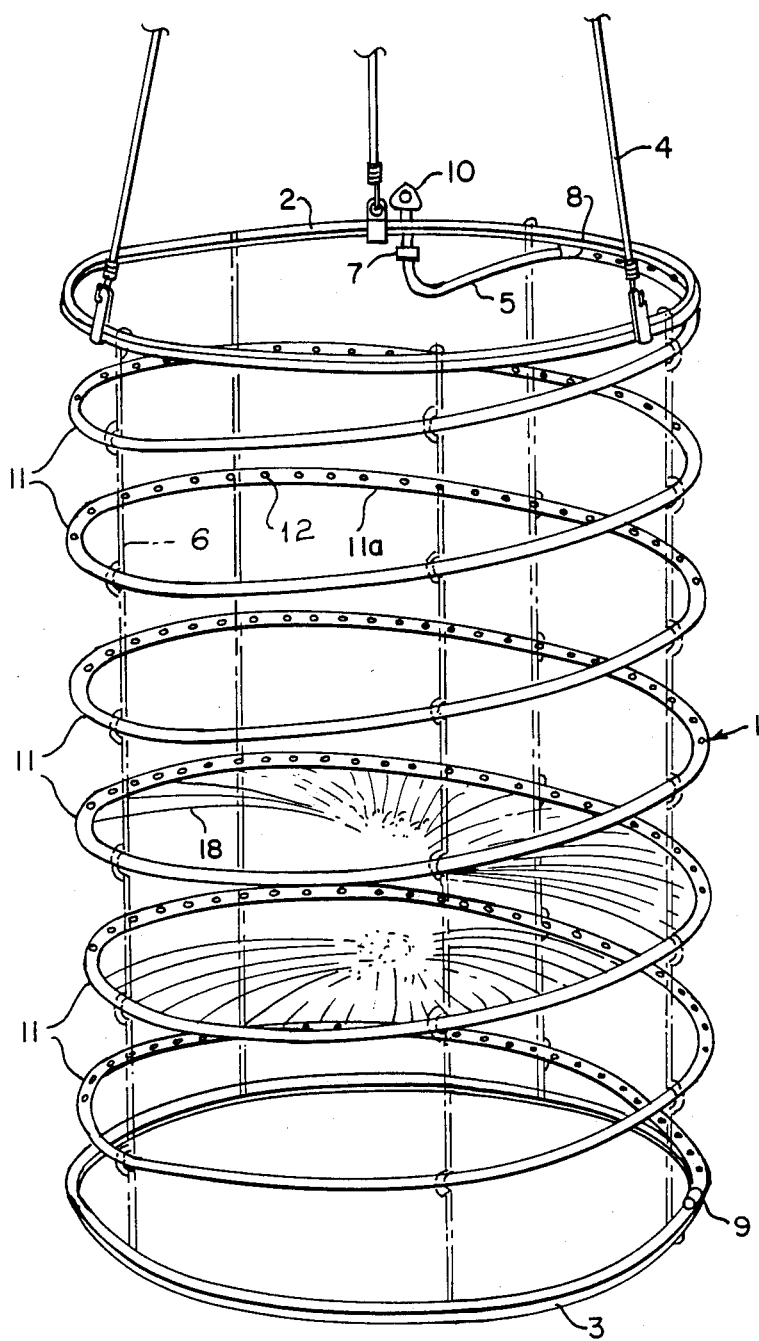
FIG. 1 shows a perspective view of a preferred embodiment of a shower installation according to the invention.

The embodiment of a shower installation according to the invention as shown in FIG. 1 comprises a hose 1 of polyvinyl chloride having a nylon fiber reinforcement. The hose is preferably 15 m long and has a circular cross sectional area having an internal diameter of 15 mm. The hose is laid in the shape of a helix having a top ring 2 and a bottom ring 3 as well as six intermediate coil windings 11, with a pitch of about 15 cm. Vertically extending nylon strings which are suspended from the top ring 2 hold the windings in position as a helix.

The ring 2 is preferably suspended from a bathroom ceiling or a frame (not shown) by means of suspension cords or rods 4. By means of a connecting inlet socket 7, a water-supply tube 5 is connected to a tap 10 of the water main and the other end of tube 5 is connected by means of a hose coupling 8 to the upper end of the hose 1. The hose coupling 8 is firmly attached to the upper ring 2. The level of the helical hose 1 above the floor can be altered by lengthening or shortening the correspondingly devised suspension cords or rods 4.

On the side 11a of the windings 11 which faces toward the central space defined by them, the hose 1 is provided with perforations 12 which have been produced with a 2, 1mm or better drill at distances of about 5 cm from each other, resulting in 20 perforations per meter, or 300 distributed uniformly over the entire length of the hose 1. The lower end 9 of the last winding 11 of the hose 1 is attached to the lower ring 3 and closed, for instance by a ligature or stopper (not shown). An outlet valve (not shown) can be provided at this end 9, in order to empty the hose 1 rapidly when not used.

The sprays 18 which are ejected from the perforations 12 have been shown in the second loop 11 of the hose, counting from the bottom end.

A person standing or sitting in the helix space inside the windings 11 will be hit about 300 fine jets whose points of impingement will be distributed over his entire body.

If in lieu of the tap 10, there is installed a temperature adjusting hot-and-cold water valve, then a person taking a shower inside the helix can easily reach such valve and adjust the temperature of the water, for instance changing rapidly from 40° C. to 10° C. and back, thus attaining the hydrotherapeutically valuable effect of an alternating hot-and-cold bath or of a sauna.

As a hot water reservoir is usually kept at a water temperature of 50° to 60° C., the user can go as high above 40° C. as he finds supportable until he begins to transpire.

In order to get in or out of the internal helix space the lower ring 3 can be lifted on one side high enough to enter the internal space or leave it comfortably.

It is also possible to lead the supporting cords 4 over an overhead roller (not shown) and attach a sand bag or the like counter weight to their free end. The helix can then be raised or lowered without effort as desired.

This type of spraying system can also be used, for instance, for the extraction of finely ground plant material or the like which is moved upward and/or downward along the central helix axis, as desired, and the extraction medium being a mixture produced by the fine jets from both hoses 1 and 20 coalescing on the surface of the material to be extracted, flows downwardly and is gathered by collector means (not shown) in the bottom zone of the system underneath both hoses. The two phases are then separated in a conventional manner, and processed further to recover the different solutes contained therein.

In FIGS. 2 to 7 there are illustrated various embodiments of the novel extractor according to the invention. In all of these embodiments there are required two tubes having the perforations and other features described hereinbefore as being characteristic of the instant invention. In one of the tubes, a heavy-phase liquid, preferably containing a mixture of solutes the components of which are to be separated from one another, is conveyed in a first direction, while in the second tube a light-phase solvent of the abovementioned properties is conveyed, preferably in countercurrent mode to the heavy-phase liquid.

Figure 2:
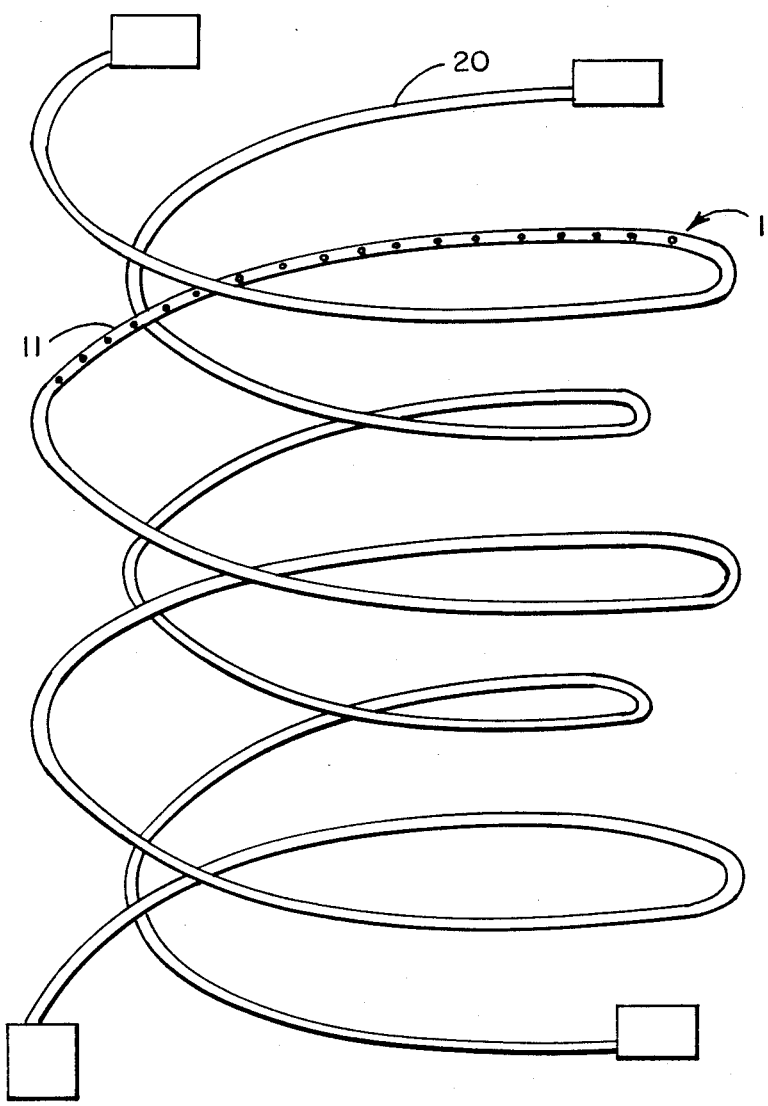
FIG. 2 is a schematic representation of a first embodiment of a liquid-liquid extractor according to the invention.

In the first embodiment of such an extractor, shown in FIG. 2, a first helical conduit 1 as illustrated in FIG. 1 is used as the first tube and a second similar helical conduit 19, of a smaller diameter, but most conveniently of equal length is used as the second tube and is placed in the internal space within the windings 11 of the first tube. The perforations 12 of the first tube 1 and the perforations (not shown) of the second tube 19 are both arranged in the same manner as shown in FIG. 1 and direct their jets toward a middle zone surrounding the common central longitudinal axis of both helices.

Figure 3:
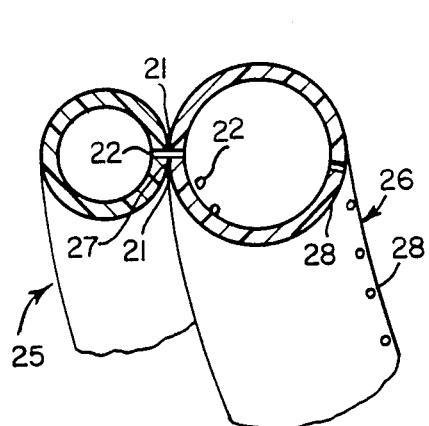
FIG. 3 is a perspective partial view of another embodiment of an extractor according to the invention.
Figure 4:
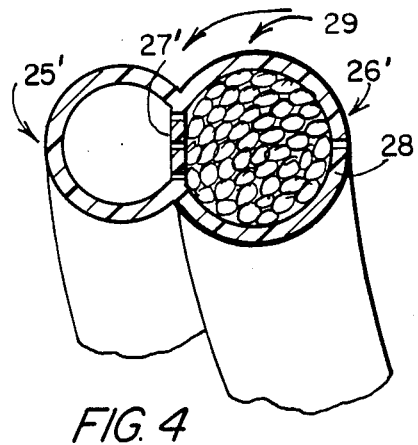
FIG. 4 is a perspective partial view of a third embodiment of an extractor according to the invention.

In the embodiments shown in FIGS. 3 and 4 the two tubes are arranged in parallel, in the embodiment of FIG. 3 are glued together by a cement bead 21 along the zone in which the outer surfaces of their tube walls touch. Perforations 22 of the novel type described hereinbefore are provided to penetrate from a left-hand tube 25 to the right-hand tube 26 through the contact zone 27 of both tubes. In the tube 26, there is provided another row of perforations 28.

Alternatively, as shown in FIG. 4, the two tubes 25' and 26' can be produced as an integral body 29, for instance by extrusion and are provided with the same perforations 22 through the common wall zone 27', and 28 in the wall zone of tube 26', opposite the perforations 22. Preferably, the tube containing the perforations 28 leading to the outside is filled with granules or beads, preferably made of glass or Teflon PFA, i.e. polyperfluoro-alkoxyethylene, marketed by E. I. DUPONT DE NEMOURS, Wilmington, Del. or similar suitable material inert to chemicals occurring in liquid-liquid extraction.

The preferred operation of the embodiments shown in FIGS. 3 and 4 comprises the steps of passing a heavy-phase solute containing liquid preferably through the tube 26 or 26' and most preferably from the upper to the lower end of the tube when the latter is in inclined or vertical position. It is also possible to arrange the tubes in serpentine shape.

At the same time, a light-phase liquid is passed through the tube 25 or 25' at an at least slightly higher pressure than prevails in the tube 26 or 26'. Thereby light-phase liquid will penetrate through the perforations 22 from the interior of tube 25 into the interior of tube 26 (or correspondingly from the interior of tube 25' into the interior of tube 26') and will intermingle therein with the heavy-phase liquid. A mixture of heavy-phase and light-phase liquids in which some components of the solute have passed from the heavyphase to the lightphase is then ejected in jet form.

Figure 6:
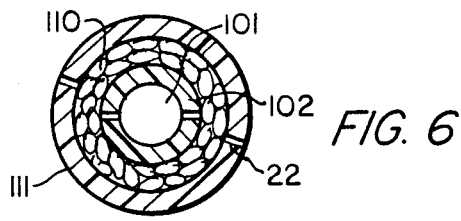
FIG. 6 is a cross sectional view of the extractor embodiment shown in FIG. 5.
Figure 5:
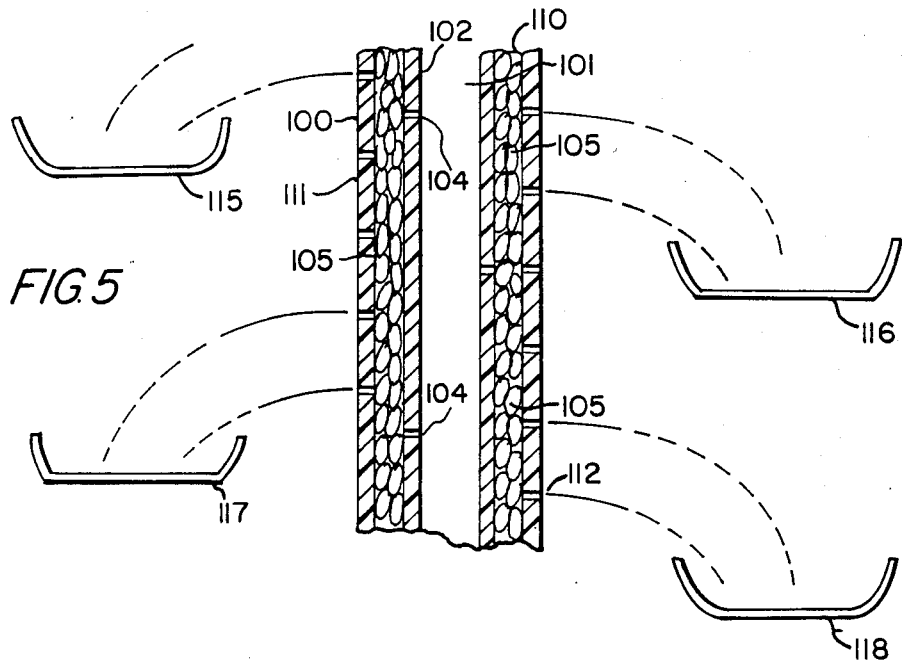
FIG. 5 is a partially sectional view of an extraction system according to the invention comprising a fourth embodiment of an extractor according to the invention together with a number of collectors.

In the embodiment of a liquid extractor according to the invention, a double hose 100 comprises an inner tubular conduit 101 shown in FIG. 5 or 6, which is surrounded by a tube wall 102 of poly-(perfluoroethylene-propylene(Teflon FEP, manufactured by E. I. DuPont de Nemours, (supra) as the elastically resilient material. The inner conduit 101 is surrounded by an outer tubular conduit 110 which is in turn enclosed in an outer tube wall 111. In the tube wall 102, there are provided a large number of perforations 104 for example 20 per meter, each of which has perferably a diameter of about 0.6 mm, produced by boring through the tube wall 102 with a twist drill having a bit diameter of 0.7 mm.

The outer tube wall 111 is likewise provided with a large number of perforations 112. The amount of liquid to be ejected through these perforations 112 from the annular interior of the outer conduit 110 must be large enough so that there can be accommodated in the zone in which a given number of perforations 104 and 112 is provided, the amount of liquid added from the entry end of the conduit 110 plus the amount of liquid injected into that zone from the inner conduit 101 through the perforations 104. The annular space in the outer conduit about the tube wall 102 is preferably filled with granules 105 of Teflon PFA (supra) which favor intermingling of the liquid flowing through the outer conduit 110 with the liquid from the inner conduit 101 injected through the perforations 104. Moreover, it reduces the flow rate of the liquid stream through this conduit 110.

For instance, when, in a given section of the double hose 100 the ratio of the volume of the inner conduit to that of the outer conduit is 1:2, and the outer conduit has 50% of its volume occupied by the aforesaid granules, so that the effective volume ratio is 1:1, and when the number of the inner perforations 104 is equal to the number of the outer perforations 112, then it is suggested that the cross sectional area of the outer perforations 112 be approximately twice the cross-sectional area of the inner perforations 104. When the inner perforations were obtained by boring with a twist drill as defined above, resulting in a cross sectional area of each perforation 104 of 1.13 mm$^2$, then, perforations 112 having each a cross sectional area of 2.25 mm$^2$, i.e. a diameter of about 0.85 mm, can be obtained by boring them with a twist drill having a bit diameter of 1 mm.

With the double hose 100 there is associated a number of collector segments vessels 115 to 118 at different levels and overlapping one another in order for each segment to catch a group of jets.

Given a length of the double hose 100 of 15 meters and 20 perforations 112 per meter, there will result 300 jets, which are collected in groups of 10 to 15 jets, requiring 20 to 30 collector segments.

The further processing of the collected quantities of liquid will be described hereinafter in connection with the embodiment shown in FIG. 7.

Figure 7:
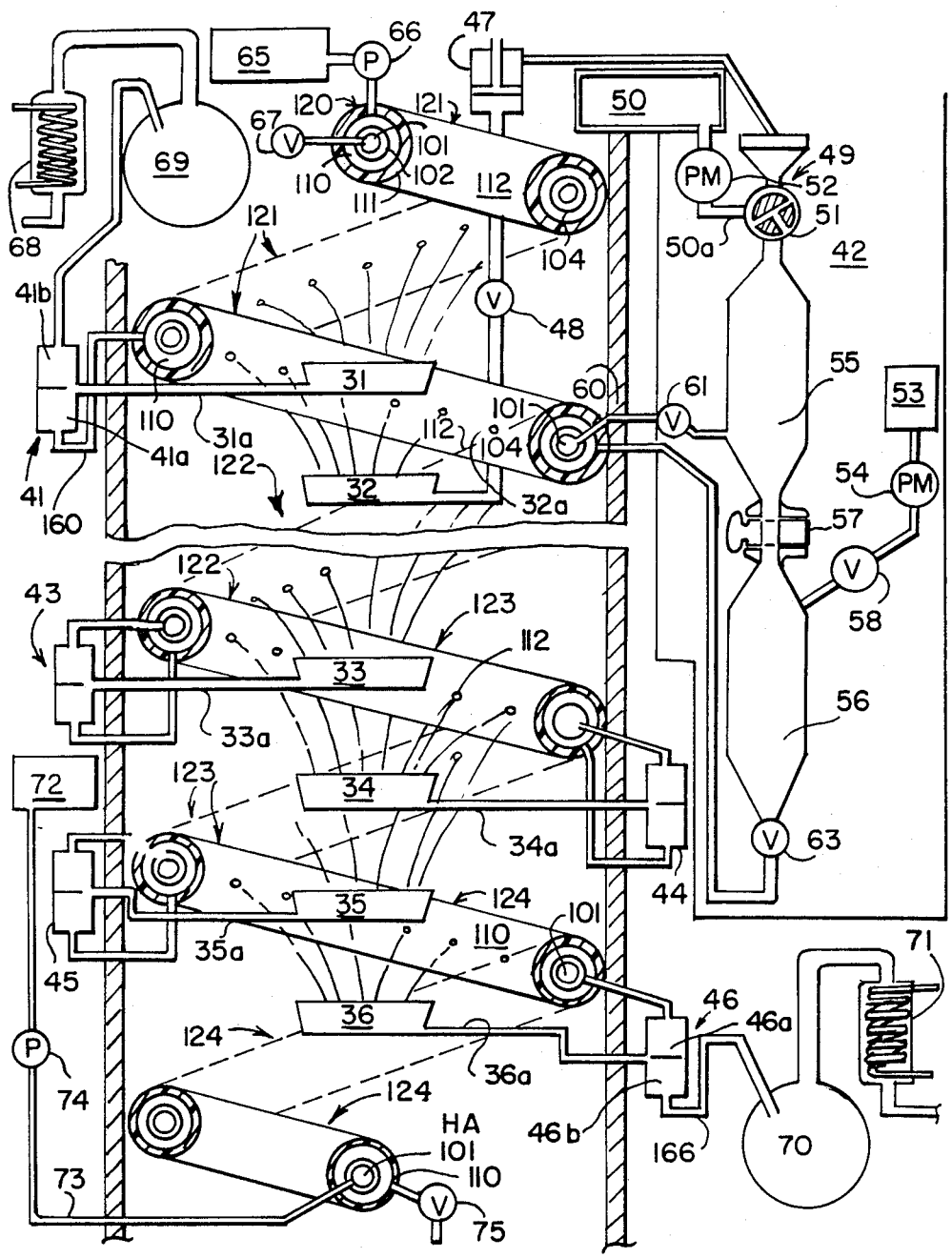
FIG. 7 is a schematic view, partially in section of an extraction plant comprising an extractor system according to the invention which contains a fifth embodiment of an extractor.

In FIG. 7 there is illustrated schematically a liquid-liquid extraction plant comprising a helix-shaped double tube conduit 120.

When built with the same dimensions as employed in the embodiment of a helix-shaped tube in FIG. 1, the conduit 120 will have in its outer tube wall 111 a total of 300 perforations 112. The pitch of the windings of the helix-shaped conduit 120 has been exaggerated in FIG. 7 for the sake of greater clarity. As in FIG. 1 the pitch would be about 15 cm when the diameter of the helix windings, taken radially with regard to the longitudinal central helix axis is about 75 cm.

The build-up of the double tube 120 is the same as in FIGS. 5 and 6 and like parts in FIGS. 5 to 7 are designated by like numerals. The portion of each helical winding situated in front of the paper plane is indicated by dashed lines, and the perforations 112 therein by dotted lines, while the rear sections are shown in full lines. While the length of the double tube 120 and the diameter, stated above, of such winding affords a number of six and one half windings, of which only four, namely windings 121, 122, 123 and 124 are shown in FIG. 7; one and a half of these windings are shown in the upper part, and two and a half windings in the lower part of the plant shown in that Figure. Each winding thus has a length of about 2.30 meters and contains 46 of the total of 300 perforations; of these 46 perforations only a few have been shown.

In a region about the axis of the helix interior, there are mounted several collector vessels of which only six are shown. Actually, if a collector vessel is provided for every three to six liquid jets directed from perforations 112 toward the central region of the helix, then there will be required one hundred to fifty such collector vessels in a somewhat different arrangement placing the dishes at points on a narrower helix of a pitch proportionate to that of the helix-shaped conduit 120, i.e. parallel with and slightly below that conduit at the inside thereof.

In practice, the spacing of these collector vessels inwardly from the windings of the conduit 120 will be such that the impingement of a group of three to six jets adjacent each other on the floor of the respective collector vessel is assured.

In FIG. 7 only six such collector vessels 31 to 36 have been shown, and have been arranged along the helix axis for the sake of clarity.

The uppermost vessel 31 has an outlet connected via a pipe 31a to the middle zone of a separator unit 41. Corresponding to the number of collector vessels there is a separator unit 42 to 46 connected to each collector vessel 32 to 36 via pipes 32a to 36a.

The separator unit 42 has been shown enlarged on the right-hand side of FIG. 7. All other separator units have the same structure, but have been indicated only schematically.

The separator unit 42 comprises a lift pump 47 which pumps the liquid mixture via a valve 48 from the vessel 32 into a funnel-shaped reservoir 49 and from there via a three-way valve 51 into an upper and a lower separator vessel 55 and 56 which are connected with each other via a shut-off cock 57. The upper separator vessel 55 is further equipped with a reservoir 50 for light-phase solvent with a pressure meter 52 in a pipe line 50a, leading into the vessel 55 from the reservoir 49 via the three-way valve 52.

Likewise, the separator vessel 56 is equipped with a heavy-phase solvent reservoir 53 from which heavy-phase solvent can be bled into the lower separator vessel 56 via a pressure meter 54 and a shut-off valve 58.

The light-phase contents of the upper separator vessel 55 can be fed back via a line 60 and valve 61 into the same zone of the inner conduit 101 of the helical double tube winding 122 from which the liquid jets are being ejected that fill the collector vessel 32, while the heavy-phase contents of the lower separator vessel 56 can be fed back via a line 62 and valve 63 into the outer tubular conduit 110 of the aforesaid helical double tube winding 122 in the same zone.

At the upper end of the uppermost double tube winding 120, there are provided a reservoir 65 of heavy-phase liquid from which that liquid can be fed continuously by means of a pump 66 into the outer conduit 110, while a valve 67 permits discharge of the residual unseparated mixture from the inner conduit 101, and offers access to that conduit for cleaning, e.g. by injection of a cleaning fluid.

From the uppermost collector vessel 31 which is disposed a short distance from the upper end of the helical double tube 120, e.g. to receive three or six of the ejected jets of liquid mixture from the first winding 121, the collected liquid passes through line 31a which is equipped in a similar manner as line 32a in the separator unit 42, into the separator unit 41, but while the heavy-phase liquid which separated out in the lower separator vessel 41a is fed back via a line 160 into the outer conduit 110 of the same winding 121, the light phase gathered in the upper separator vessel 41b of this uppermost unit is conveyed by a suitable lift pump (not shown) into an evaporator 67 in which the solute contained in this light-phase liquid is recovered while the light-phase solvent vapors can be recovered in a condenser 68.

From the lowermost collector vessel 36 the collected liquid mixture is fed into the separator 46, from where the supranatant light phase in the upper separator vessel 46b is fed back into the inner conduit 101 in the same zone of winding 124 from which liquid was ejected from the outer conduit 110 into the collector vessel 36. The heavy phase obtained in the separator vessel 46a is conveyed through a line 166 to an evaporator 70 in which the solute of the heavy phase liquid is recovered, while the heavy phase solvent is recovered in a condenser 71.

Fresh light phase solvent can be delivered from a reservoir 72 therefore via a feed line 73 and with the aid of a pump 74 into the lower end of the inner conduit 101. Residual heavy phase waste liquid not gathered in the collector vessel 36 can be discharged from the outer conduit 110 via a discharge valve 75, through which a cleaning fluid can also be injected into the conduit 110 after the same has been emptied from extraction liquid.

The apparatus and the method for liquid-liquid extraction according to this aspect of my invention as described hereinbefore affords a continuous countercurrent distribution involving an iterative extraction, in which a combination of cross-current and countercurrent techniques is employed.

The fact that all elements of an extraction plant according to my invention are stationary with the exception of pumps, the consumption of energy in the whole plant can be kept at a minimum.

Moreover, the extraction tube means are most simple and inexpensive to construct as compared with complicated columns in the prior art requiring the mounting of a number of baffles in an extraction tower, which in term requires interface control in order to prevent depletion. There is no danger of depletion in operating my novel extraction plant.

Another drawback of the known extraction apparatus operating with columns in which the two phases pass through superimposed chambers separated by perforated baffles or sieves is that the formation of emulsions will occur easily and these emulsions will then pass from chamber to chamber without having time during the process to separate again into their phases before they reach the end of the column. In contrast thereto, if emulsion occurs in any zone of my double tubes, the portion of liquid which contains the emulsion is promptly ejected in several successive jets into one or several collector vessels and passed on from there to a reservoir or to a separator unit before being fed back into the extraction double tube. Thus, the emulsion in such ejected liquid portions has ample time to separate again into its phases.

Another important advantage of my novel liquid-liquid extraction apparatus and method resides in the fact that the volumes of the separated phases which have to be processed further to recover the desired solutes are much smaller than those obtained from comparable extraction methods such as described by Baird.

Thus, separations by solvent extraction described by E. G. Scheibel in Chemical Engineering Progress (Vol. 62, No. 9 of Sep.1966) requires continuous removal of about 25% of the total operating liquid for the purpose of evaporation and recovery of the solute and solvent. In my process it is possible to carry out this evaporation and recovery with small fractions of liquid separated phases amounting to as little as 5% of the total volume of liquid in circulation in the plant.

This requires correspondingly smaller recovery units and correspondingly less energy consumption per time, especially when taking into account that the losses due to disturbing factors such as depletion or emulsification can be completely avoided in my method and apparatus.

I claim:

1. A method of liquid-liquid extraction of at least one solute dissolved in a first liquid being a solution of said solute in a solvent therefor, comprising the steps of
    (a) directing a stream of said first liquid through a first elongated channel from an entry end toward a terminal end of said first channel, and maintaining in said first channel a determined pressure above ambient,
    (b) directing a stream of a second liquid of different density, counter-currently to said first liquid stream, through a second elongated channel from an entry end toward a terminal end of said second channel, and maintaining in said second channel a pressure lower than said pressure in said first channel,
said first and second channels having longitudinal axes, and one of said first and second liquids being the heavier, and the other the lighter one,
    (c) maintaining between said first and second channels, a separating wall zone of liquid-tight elastically resilient material being substantially non-swelling when in contact with water having a temperature of 60° C. or higher, or when in contact with organic extraction solvents, said wall zone having a first and a second contact surface on opposite sides thereof, which surfaces border on said first and second channels, respectively, extending parallel with the axes of said channels;
said wall zone containing a plurality of crosswise passages therethrough from said first to said second contact surface, said passages being distributed uniformly along said wall zone in axial direction,
    (d) passing a large number of streams of said first liquid, ejected from said first channel through said passages successively into said second channel and intermingling said first liquid streams therein cross-currently with said stream of second liquid flowing countercurrently through said second channel, while at the same time maintaining said exit end of said first channel at least substantially obturated, thereby maintaining in said first channel a determined pressure above the pressure prevailing in said second channel, and maintaining said exit end of said second channel obturated,
    (e) ejecting a large number of fine liquid jets of the resulting liquid mixture iteratively out of said second channel, transversely to the direction of liquid flow through said second channel;
    (f) collecting groups of said liquid jets, from successive ejection zones of said second channel,
    (g) settling the portions of the liquid mixture, obtained from such zones, with phase separation,
    (h) separating the resulting heavier and lighter phases of each liquid portion from each other,
    (i) back-feeding the separated heavier phase of a liquid portion from an intermediate zone of said second channel, into approximately the same zone, but of that channel which contains the stream of the heavier liquid, and
    (j) back-feeding the lighter phase of a liquid portion from an intermediate zone of said second channel, into approximately the same zone of that channel which contains the stream of the lighter liquid;
    (k) recovering from that ejection zone last preceding the terminal end of said second channel one of said phases resulting from the separation of the liquid portion collected from said zone, and back-feeding the other phase into the said first channel, in said last-mentioned ejection zone.

2. The method of claim 1, wherein at least a major portion or all of the volume of said light-phase liquid consisting of a light-phase solvent, and at least a major portion of the volume of said heavy-phase liquid consisting of a heavy-phase solvent, said light-phase and heavy-phase solvents being miscible with an immiscibility gap or being totally immiscible with one another.

3. The method of claim 2, wherein one of said streams is an annular stream having a hollow longitudinal space in its interior, and that the other stream is directed countercurrently thereto through said hollow interior of said firstmentioned stream.

4. The method of claim 3, wherein said annular stream is a stream of heavy-phase liquid and the other stream is a stream of light-phase liquid.

5. The method of claim 4, wherein said annular stream of heavy-phase liquid is directed from a higher level downward to a lower level, and the stream of light-phase liquid is directed through the interior of said annular stream, but from said lower level upward to said higher level.

6. A liquid-liquid extractor apparatus in which a light-phase liquid and a heavy-phase liquid are intimately mixed in a column to provide for the extraction of a solute from one of the phases by the other phase, which apparatus comprises:
    (a) a first conduit for liquid-liquid extraction, said conduit having two conduit ends, one of which is closable and the other is open;
    (b) feeding means connected to said open end of said first conduit, for introducing one of said light-phase and heavy-phase liquids containing therein solute to be extracted by the other liquid into the interior of said first conduit, (c) a second conduit having two ends one of which is closable and the other is open;

(d) second feeding means connected to said open end of said second conduit, and being adapted for introducing the other one of said light-phase and heavy-phase liquids into the interior of said second conduit, (e) each of said first and second conduits having a hollow interior extending from one end of the respective column to the other; and comprising a tube wall of liquidtight, elastically resilient material, being non-swelling in contact with water of a temperature of 60° or higher and with organic extraction solvents, said tube wall surrounding said hollow elongated conduit interior and having an external and an internal tube wall surface; and said first conduit comprising (f) a large number of uniform perforations of substantially circular cross-sectional area, said perforations leading from said conduit interior of said first conduit through the tube wall of said first conduit into the hollow interior of said second conduit; and said second conduit comprising (g) a large number of uniform capillary active perforations of substantially circular cross-sectional area through said tube wall of said second conduit leading from said conduit interior of said second conduit to outside said external tube wall surface thereof, all of said perforations of said first and second conduits being of such configuration and width that, when said interior of said second conduit is filled with liquid under a pressure above the ambient pressure, said perforations of said second conduit will permit ejection of liquid from the interior of said second conduit to the outside as a fine liquid jet, and when said interior of said first conduit is filled with a liquid under pressure above that prevailing in said second conduit, said perforations of said first conduit will permit the ejection of liquid from the interior of said first conduit into the interior of said second conduit.

7. The liquid-liquid extractor apparatus of claim 6, wherein said first and second conduits are arranged parallel with one another and comprise a contact zone in which said tube wall of said first conduit is merged with said tube wall of said second conduit, and said perforations in said tube wall of said first conduit lead from the interior of said first conduit into the interior of said second conduit.

8. The liquid-liquid extractor apparatus of claim 6, wherein said first conduit is mounted in the interior of said second conduit, constituting a double tube comprising an inner and an outer conduit as said first and second conduits, surrounding a common longitudinal axis and having concentric cross-sectional areas.

9. The liquid-liquid extractor apparatus of claim 8, wherein said double tube has the configuration of a helix, the windings of which enclose a helix interior having a central helix axis.

10. The liquid-liquid extractor apparatus of claim 9, wherein the perforations in the tube wall enclosing said second, outer conduit are so disposed therein as to direct the jets ejected through them toward said central helix axis, describing ballistic curves.

11. The liquid-liquid extractor apparatus of claim 6, further comprising a plurality of collecting vessels associated with stages consisting of a determined number of said perforations of said second conduit and arranged in axial direction along said second conduit to collect the liquid ejected from the perforations of each of said stages, respectively.

12. The liquid-liquid extractor apparatus of claim 11, further comprising a plurality of separator units of which each unit is connected to a collecting vessel, each separator unit comprising a chamber for separated heavy-phase liquid and a chamber for separated light-phase liquid, first pipe line means connecting said chamber for light-phase liquid with that one of said first and second conduits fed with light-phase liquid, and second pipe line means connecting said chamber for heavy-phase liquid with the other one of said first and second conduits being fed with heavy-phase liquid, in the same zone of said first and second conduits in which the perforations of said second conduit are located from which the liquid jets collected in the collecting vessel connected with said separator unit have been ejected.

* * * * *